United States Patent
Chistyakov et al.

(10) Patent No.: US 11,379,581 B2
(45) Date of Patent: Jul. 5, 2022

(54) SYSTEM AND METHOD FOR DETECTION OF MALICIOUS FILES

(71) Applicant: AO Kaspersky Lab, Moscow (RU)

(72) Inventors: Alexander Chistyakov, Moscow (RU); Alexey M. Romanenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 381 days.

(21) Appl. No.: 16/815,170

(22) Filed: Mar. 11, 2020

(65) Prior Publication Data

US 2021/0097177 A1    Apr. 1, 2021

(30) Foreign Application Priority Data

Sep. 30, 2019    (RU) .......................... RU2019130601

(51) Int. Cl.
| | |
|---|---|
| *G06F 21/56* | (2013.01) |
| *G06F 16/14* | (2019.01) |
| *G06N 20/00* | (2019.01) |
| *G06F 17/18* | (2006.01) |

(52) U.S. Cl.
CPC .............. *G06F 21/56* (2013.01); *G06F 16/14* (2019.01); *G06F 17/18* (2013.01); *G06N 20/00* (2019.01)

(58) Field of Classification Search
CPC .......... G06F 21/56; G06F 16/14; G06F 17/18; G06F 21/564; G06F 21/563; G06N 20/00; G06N 3/0445; G06N 3/0454; G06N 3/0472; G06N 3/086; G06N 7/005; G06N 20/10

See application file for complete search history.

(56) References Cited

U.S. PATENT DOCUMENTS

| | | | | |
|---|---|---|---|---|
| 9,288,220 | B2* | 3/2016 | Raugas | H04L 63/145 |
| 10,467,411 | B1* | 11/2019 | Pidathala | G06F 21/56 |
| 2010/0180344 | A1* | 7/2010 | Malyshev | H04L 63/145 |
| | | | | 726/23 |
| 2012/0023579 | A1* | 1/2012 | Zaitsev | H04L 63/145 |
| | | | | 726/23 |
| 2015/0186192 | A1* | 7/2015 | Dyakin | G06F 9/54 |
| | | | | 719/313 |

(Continued)

OTHER PUBLICATIONS

Lee Jehyun et al: "Screening smartphone applications using malware family signatures", Computers & Security, Elsevier Science Publishers. Amsterdam, NL, vol. 52, Feb. 21, 2015.

*Primary Examiner* — J. Brant Murphy
(74) *Attorney, Agent, or Firm* — ArentFox Schiff LLP; Michael Fainberg

(57) ABSTRACT

A method for detection of malicious files includes training a mapping model for mapping files in a probability space. A plurality of characteristics of an analyzed file is determined based on a set of rules. A mapping of the analyzed file in probability space is generated based on the determined plurality of characteristics. A first database is searched using the generated mapping of the analyzed file to determine whether the analyzed file is associated with a family of malicious files. The first database stores mappings associated with one or more families of malicious files. In response to determining that the analyzed file is associated with the family of malicious files, a selection of one or more methods of malware detection is made from a second database. The second database stores a plurality of malware detection methods. The selected method is used to detect the associated family.

20 Claims, 9 Drawing Sheets

(56) References Cited

U.S. PATENT DOCUMENTS

| | | | |
|---|---|---|---|
| 2016/0098560 A1* | 4/2016 | Friedrichs | G06F 21/562 |
| | | | 726/23 |
| 2016/0156658 A1* | 6/2016 | Thomas | G06F 21/566 |
| | | | 726/24 |
| 2017/0353477 A1* | 12/2017 | Faigon | G06F 21/6209 |
| 2018/0114018 A1* | 4/2018 | Zhang | G06F 21/562 |
| 2019/0026466 A1* | 1/2019 | Krasser | G06N 20/20 |
| 2021/0019408 A1* | 1/2021 | Chrysaidos | G06F 21/566 |

* cited by examiner

SYSTEM AND METHOD FOR DETECTION OF MALICIOUS FILES

CROSS-REFERENCE TO RELATED APPLICATION

This application claims benefit of priority under 35 U.S.C. 119(a)-(d) to a Russian Application No. 2019130601 filed on Sep. 30, 2019, which is incorporated by reference herein.

FIELD OF TECHNOLOGY

The present disclosure relates to the field of information technology (IT) security, and, more specifically, to detection of malicious files.

BACKGROUND

With the rapid development of computer technologies various electronic devices (such as personal computers) and various portable devices (such as notebooks, tablets, mobile phones, and the like) are now in widespread use. Now, such devices are the major means of communication in business, industry, government and social intercourse. For example, mobile phones provide various functionalities for people, such as short message services, communications, games, calendars, music, etc. In parallel with the growth in the number of computing devices and the software running on these devices, the number of malicious programs has also grown at a rapid pace.

At present, there exists a very large number of varieties of malicious programs. Some types of malicious programs are employed to steal personal and confidential data from the various user devices (for example, usernames and passwords, bank details, electronic documents). Other types of malicious programs form so-called botnets from user devices for attacks such as a DDoS (Distributed Denial of Service) against other computers or for cracking user passwords using so-called brute force method. Still other types of malicious programs propose paid content to users through intrusive advertising, spamming, sending of SMS to toll numbers, and so forth.

Generally, specialized programs known as antiviruses are used to deal with malicious programs, including the detection of the malicious programs, the prevention of infection, and the restoration of the working capacity of the computing devices infected with malicious programs. Antivirus programs employ various technologies to detect the full variety of malicious programs, such as:

static analysis (including signature analysis and white/black list analysis)—the analysis of programs for malware, excluding the launch or emulation of the execution of the analyzed programs, on the basis of the data contained in files making up the programs being analyzed, while statistical analysis can be used:
    signature analysis—the search for correspondences of any part of the code of the analyzed programs to the known code (signature) from the malware signature database.
    white and black lists—the search for calculated checksums from the analyzed programs (or their parts) in the malware checksum database (black lists) or the safe checksum database (white lists);
  dynamic analysis (including heuristic analysis and proactive defense)—the analysis of malware programs on the basis of data obtained during the execution of the analyzed programs:
    heuristic analysis—the emulation of the work of the analyzed programs, the creation of emulation logs (containing data on calls to Application Programming Interface (API) functions, passed parameters transmitted, code sections of the analyzed programs, etc.) and the search for data matches from the created logs with data from the database of malware signatures;
    proactive defense—interception of calls of API functions of running analyzed programs, creation of behavior logs of the analyzed programs (containing data on calls to API functions, passed parameters, code sections of analyzed programs, etc.) and search for data matches from created logs with data from the database of malicious call data.

Both static and dynamic analysis approaches have their pros and cons. Static analysis is less demanding on the resources of the computing device on which the analysis is performed, and since it does not require execution or emulation of the analyzed program, static analysis is faster, but less efficient. For example, static analysis may have a lower percentage of malware detection and a higher percentage of false positives (i.e., deciding on the harmfulness of a file analyzed by the anti-virus program, even though the analyzed file is safe). Dynamic analysis, due to the fact that it uses the data obtained during the execution or emulation of the analyzed program, is slower and makes higher demands on the resources of the computing device on which the analysis is performed, but at the same time it is more efficient.

At, present, for a reliable detection of the majority of malicious programs it may be necessary to use several different methods of detection of malicious programs in succession, which is often excessive.

For example, if a malicious program is a well-known program and rules of detection have been developed for it, it may not be necessary to employ dynamic methods of detection which are more demanding of resources of the computing device on which the analysis is done. In other words, such malicious program may be detected by fast methods less demanding of computing resources (such as, for example, signature analysis). However, if a malicious program is new then the use of fast methods may not be as effective and may not lead to a positive detection of such new malicious program. In such cases it may be more appropriate to use more effective malware detection methods, even if such methods are more demanding of resources of the computing device.

Accordingly, if there is a possibility of quickly determining in advance exactly which category a malicious program being analyzed belongs to, it is desirable to select a method that would generally provide the most efficient level of detection of the malicious programs.

Although the conventional security technology deals well with the detection of malicious files having certain characteristic features (i.e., data describing certain features of files from a certain group of files, such as the presence of a graphic interface, data encryption, data transmission through a computer network, and so on) similar to the characteristic features of already known malicious files, conventional security technology is often unable to detect malicious files having characteristic features different from the characteristic features of already known malicious files (albeit similar behavior).

Thus, there is a need to select a method of detection of malicious files for more efficient utilization of computer resources.

SUMMARY

Aspects of the disclosure relate to the field of antivirus scanning of files.

One technical result of the disclosure is to optimize the utilization of computing resources in the scanning of a file for malware.

Yet another technical result of the disclosure is to increase the effectiveness of the selection of a mode of detection of malicious files.

Yet another technical result of the disclosure is to change the category of a file being analyzed.

In one exemplary aspect, a method for detection of malicious files includes: training a mapping model for mapping files in a probability space characterizing one or more families of malicious files. A plurality of characteristics of an analyzed file is determined based on a set of rules. A mapping of the analyzed file in probability space is generated based on the determined plurality of characteristics. A first database is searched using the generated mapping of the analyzed file to determine whether the analyzed file is associated with a family of malicious files. The first database stores mappings associated with one or more families of malicious files. In response to determining that the analyzed file is associated with the family of malicious files, a selection of one or more methods of malware detection is made from a second database. The second database stores a plurality of malware detection methods. The selected method is used to detect the associated family of malicious files.

In one aspect, the probability space is a multidimensional space. The probability space provides a probability distribution for the plurality of characteristics associated with the analyzed file. In one aspect a pair of one of the plurality of characteristics of the analyzed file and one of a plurality of attributes associated with the behavior of the analyzed file are matched up with a probability that the behavior described by the one of the plurality of attributes is typical to the analyzed file having the one of the plurality of characteristics.

In one aspect, the generated mapping includes an aggregate of a plurality of parameters describing a surface associated with the analyzed file. The surface is situated in the probability space.

In one aspect, the first database includes a mapping of a file associated with a particular family of malicious files.

In one aspect, the first database includes a summary mapping of a plurality of files associated with a particular family of malicious files.

In one aspect, the searching of the first database includes identifying an association between the analyzed file and one of the files associated with the family of malicious files. A degree of similarity between the mapping of the analyzed file and mapping of the file associated with the family of malicious files exceeds a predetermined threshold value.

In one aspect, the method further includes retraining the mapping model to increase the degree of similarity between the mapping of the analyzed file and a mapping of one of the files associated with the family of malicious files within the trained mapping model as compared to a corresponding degree of similarity between respective files within the mapping model prior to performing the retraining.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for spam identification. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A number of definitions and concepts that will be used in describing variant aspects of the present disclosure will now be introduced.

Safe file—a file whose execution is known to be unable to result in the unauthorized destruction, blocking, modification, copying of computer information or neutralization of the means of protection of computer information.

Malicious file—a file whose execution is known to be able to result in unauthorized destruction, blocking, modification, copying of computer information or neutralization of the means of protection of computer information.

Malicious behavior of an executable file—a group of actions which may be performed during execution of such a file and which are known to be able to result in unauthorized destruction, blocking, modification, copying of information or neutralization of the means of protection of computer information.

Malicious activity of an executable file—a group of actions performed by such a file in accordance with its malicious behavior.

Suspicious file—a file whose execution is able with a certain probability to result in unauthorized destruction, blocking, modification, copying of computer information or neutralization of the means of protection of computer information, where such a probability can be assessed on the basis of data on the file itself (the source of origin of the file, the developer information, the popularity among users) or from data on the behavior of the operating system or applications upon executing the file.

Conditionally safe file—a file whose execution, according to its declared functionality, should not result in unauthorized destruction, blocking, modification, copying of computer information or neutralization of the means of protection of computer information, although during unauthorized use of that file or when that file is used by methods other than the declared methods such result can be achieved.

Various aspects of the disclosure enable selection of a method of detection of malicious files.

Figure 1:
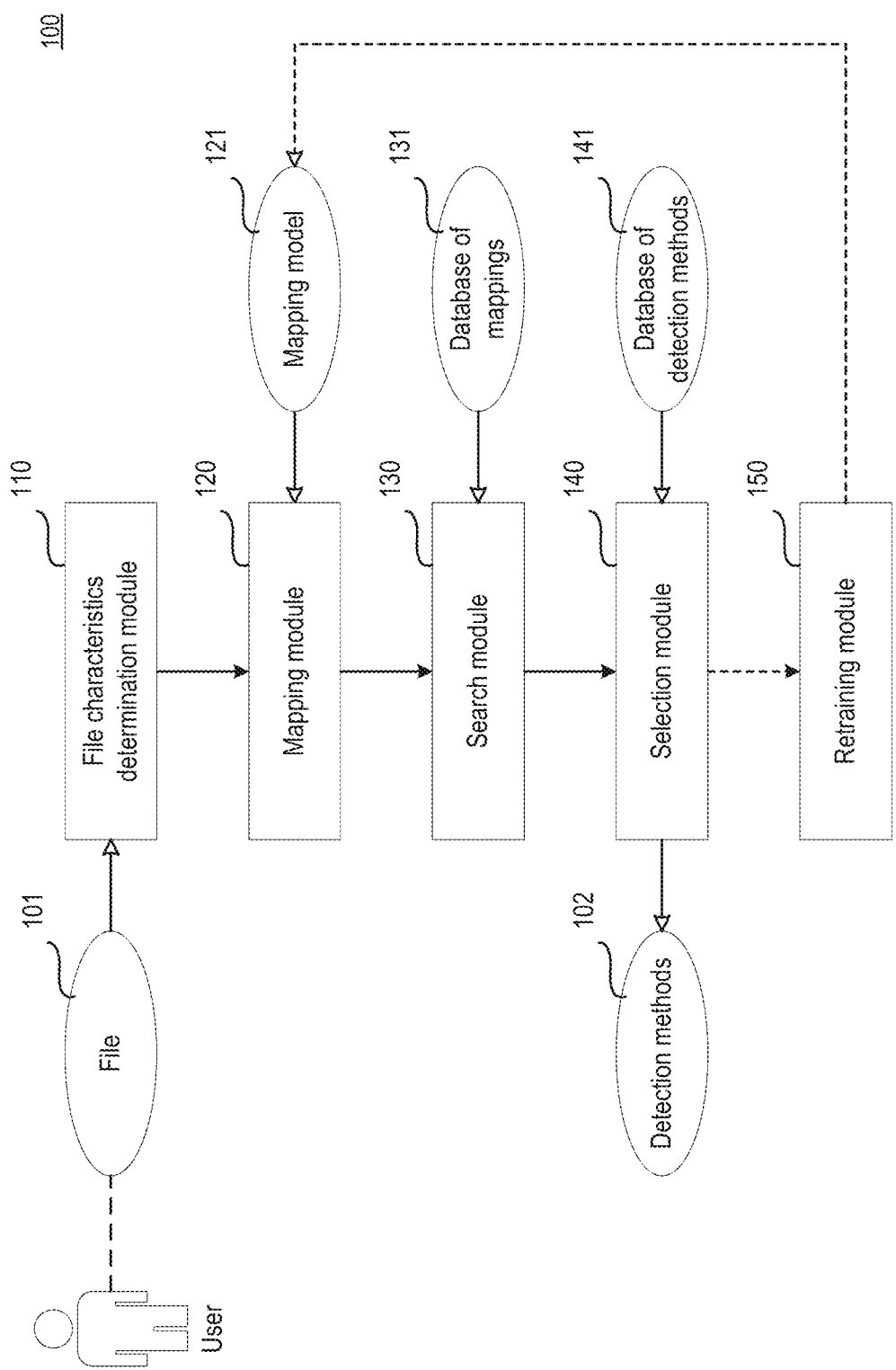
FIG. 1 illustrates the high-level architecture of the system realizing the method for detection of malicious files, in accordance with aspects of the present disclosure.

FIG. 1 illustrates the high-level architecture of the system implementing the method for detection of malicious files, in accordance with aspects of the present disclosure.

The system implementing the method for detection of malicious files includes a file 101, methods of detection of malicious files 102, a file characteristics determination module 110 configured to determine the characteristics of the file 101, a mapping module 120 configured to generate a mapping of the file 101 based on a mapping model 121, a search module 130, a database of mappings 131, a selection module 140, a database of detection methods of malicious files 141, and a retraining module 150.

According to aspects of the present disclosure, file characteristics determination module 110 may be configured to determine the characteristics of the file 101 on the basis of predetermined rules. In addition, file characteristics determination module 110 may be configured to send the determined characteristics of the file 101 to the mapping module 120.

In one exemplary aspect, the characteristics of the file 101 may include, but are not limited to, metadata associated with the file 101, file structure of the file 101, packing information associated with the file 101, byte representation of the file 101, representation of the disassembled binary file 101, import/export tables associated with the file 101, the string constants contained in the file 101, the results of the working of manual expert heuristics associated with the file 101, and the like. The metadata associated with the file 101 may include, but is not limited to, file name, file size, file type, creation date, modification date, access date, file access rights, and the like. File structure of the file 101 may include, but is not limited to, the data written in a file header, information related to file sections, such as, the size and type of file section, the name of file section, and the like. Packing information associated with the file 101 may include data associated with the packers which packed the file 101, such as, but not limited to, name and version of the packer, the packing parameters, and the like. The results of the working of manual expert heuristics associated with the file 101 may include the manual expert heuristics constituting a group of rules to search for various dependencies and to calculate various weighting factors, and the like. As a non-limiting example, the file characteristics determination module 110 may be also configured to determine the following characteristics of the file 101:

the file size (in bytes);
the number of sections;
the presence of a signature;
the entropy (the frequency distribution of characters, lexemes, and so forth, and the departure of those distributions from the normal distribution);
the size of the import table;
the number of assembler jump instructions;
a flag indicating that the file 101 contains the byte sequence 0xABCDEF1313.

The mapping module 120 may be configured to generate the mapping of the file 101 in probability space using the trained mapping model 121 based on the determined characteristics of the file 101. The mapping module 120 may be also configured to send the formed mapping of the file 101 to the search module 130. In one aspect, probability space is a multidimensional space in which each pair of characteristics of the file 101 and attributes of the behavior of the file 101 may be matched up with a probability that the behavior described by the given behavior attributes is typical to the file 101 having those characteristics.

In yet another aspect, the mapping of the file 101 may comprise an aggregate of parameters describing a surface situated in that probability space.

In yet another aspect of the present disclosure, the behavior attributes of the file 101 may include, but are not limited to:

the structure and content of the network traffic generated by the executable file 101;
the state of the operating system during and after the completion of execution of the file 101 (including the use of computing resources by the operating system, such as RAM, the workload of the processor, dynamic libraries linked, the launched services, and so forth);
information about the user interaction with the executable file 101;
the results of the working of manual expert heuristics on the file 101.

In yet another aspect, the mapping model 121 may be trained using one or more of the following approaches: deep learning algorithms, genetic algorithms, mapping (embedding) methods, such as, but not limited to, latent vector space, vector distribution, reinforcement learning methods, and the like.

In yet another aspect, the mapping of the file 101 may be generated using at least one of the algorithms:

deep neural networks;
convolutions;
recurrent neural networks (RNNs);
neuro-encoders;
variational autoencoders;
Bayesian networks;
similarity learning;
representations in latent hyperbolic space (as a particular case of a representation in latent non-Euclidean space, or hyperbolic embeddings).

The search module 130 may be configured to search the database of mappings 131 for a family of malicious files on the basis of the formed mapping of the file 101. The search module 130 may be further configured to send the results of the search to the selection module 140.

In one variant aspect of the present disclosure, the database of mappings 131 may include, but is not limited to: a mapping of a file belonging to a given family of malicious files, a summary mapping of all files belonging to the given family of malicious files, and the like.

In yet another aspect, the search module 130 may perform a search in the database of mappings 131 for a family of malicious files including, but not limited to: a family containing a file whose mapping has a degree of similarity to the formed mapping of the file 101 which is greater than a predetermined established threshold value, a family having the summary mapping of all files having a degree of similarity to the formed mapping of the file 101 greater than a predetermined threshold value.

In yet another aspect, the search module 130 may employ one or more of the following techniques:
- a nearest neighbors search, such as locality-sensitive hashing, ball trees, and the like;
- a density estimation, such as kernel density estimation function, MinCount sketch.

It should be noted that search results are explained in greater detail below in conjunction with FIG. 3.

The selection module 140 may be configured to select, from a database of detection methods of malicious files 141, the methods of detection of malicious files 102 which correspond to the family of malicious files found in the database of mappings 131.

The selection module 140 may be further configured to change the category of the file being analyzed 101, if a certain category had been previously assigned to file 101. Such category may include, but is not limited to:
- the category of malicious files;
- the category of safe files;
- the category of conditionally safe files;
- the category of suspicious files;
- the category of unknown files.

The retraining module 150 may be configured to retrain the mapping model 121 in a manner such that the degree of similarity of the generated mapping of the file 101 to a mapping of at least one file from a given family of malicious files is greater than such degree prior to the retraining of the mapping model 121.

In one aspect, the retraining of the mapping model 121 may involve at least:
- initial training of the mapping model 121;
- continuous training of the mapping model 121, correction of the mappings of known files 101 and training the model based on the corrected mappings.

Advantageously, a selection of method of detection of malicious files addresses a number of aforementioned technical problems. For example, the selection of optimal method of detection reduces utilization of resources of the computing device on which the analysis is done due to the fact that this approach uses only specialized means of detection having the highest effectiveness (e.g., detection rate). In addition, such selection reduces the burden on analysts working manually with malicious files. In other words, the disclosed techniques enable selection, from a given sample of files, of new files not pertaining to already known malicious families (such as files having a little-known or unknown structure or behavior). Aspects of the present disclosure contemplate sorting of files being analyzed into files with known behavior and structure for which effective detection means are already known, and files with unknown behavior or structure for which no effective detection means are known. Conventional malware detection techniques employ several detection means jointly for the detection of the malicious files, which is suboptimal. A simplified algorithm of the selection of optimal method of malware detection may include the following steps performed by the mapping module 120: for all files 101 previously dispatched for dynamic analysis, the vectors of the behavior parameters are calculated on the basis of the behavior logs:

$$V_i = ML_2(\log_i),$$

where $ML_2$ is the trained mapping model 121 working with the behavior parameters of the file 101 $\log_i$, and these vectors are saved in a database;

1) for all the files 101 not yet having undergone the above-described analysis, there is calculated:

$$v_i = ML_1(\log_i)$$

where $ML_1$ is the trained mapping model working with the characteristics of the file 101 file$_i$;

2) if computing resources are available for the dynamic analysis of K files, then from all the previously unprocessed files K files are selected such that their distance to the closest previously known file behavior log is a minimum (this processing step is described in greater detail below in conjunction with FIG. 4):

$$\text{Novelty}(\text{file}) = \min_{\{i=1 \ldots N\}} \text{Distance}(ML_1(\text{file}), v_i).$$

It should be noted that in some cases:
1) a considerably more complex attribute description of the file 101 may be used (both characteristics of the file 101, and behavior parameters of the file 101);
2) a considerably more complex architecture may be used for the models $ML_1$, $ML_2$, (EncF, DecF, EncL, DecL), where
   EncF is a function mapping the file into probability space,
   EncL is a function mapping the file behavior log into probability space,
   DecF is a function mapping data from probability space into the file,
   DecL is a function mapping data from probability space into the file behavior log;
3) a considerably more flexible distance function may be used (for example, the models $ML_1$, $ML_2$, may return a parametrized distribution in infinite-dimensional space at the output, and the asymmetrical similarity metric between the two distributions may be calculated);
4) the principle for the construction of the functions $ML_1$, $ML_2$ may be modified, for example, instead of training 2 models it is possible to train 4 models:

$$EncF(\text{file}, W_f) \to v,$$

$$EncL(\log, W_l) \to v,$$

$$DecF(v, V_f) \to \text{file}',$$

$$DecL(v, V_l) \to \log',$$

and the training may strive to minimize the distances between the initial and the decoded attribute descriptions:

$$\text{Distance}(\text{file}_i, DecF(EncF(\text{file}_i))),$$

$$\text{Distance}(\log_i, DecL(EncF(\text{file}_i))),$$

$$\text{Distance}(\text{file}_i, DecF(EncL(\log_i))),$$

$$\text{Distance}(\log_i, DecL(EncL(\log_i))),$$

and maximize the corresponding distances for different pairs of the file behavior logs;

5) for the same file, several behavior logs corresponding to it may be saved (the file behavior may change when run at different times) and be considered during the evaluation of similarity;

6) in some cases not all representations may be saved from previously processed files but, for example, the representations of certain representatives or centroids (for memory economy/faster search);

7) in some cases a chain of prioritizations may be used:

Light static analysis→Light emulator→Deep static analysis→Prolonged emulation and the models $ML_1(file_{light})$, $ML_2(log_{light})$, $ML_1(file_{deep})$, $ML_2(log_{deep})$ $ML_1(file_{light})$, $ML_2(log_{light})$, $ML_1(file_{deep})$, $ML_2(log_{deep})$ may be trained by an analogous principle.

As a result, after each processing step the most familiar objects may be sorted out (i.e., prioritizing the sending on for deep static analysis based on an averaging/combining of known $ML_1(file_{light})$, $ML_2(log_{light})$).

Figure 2:
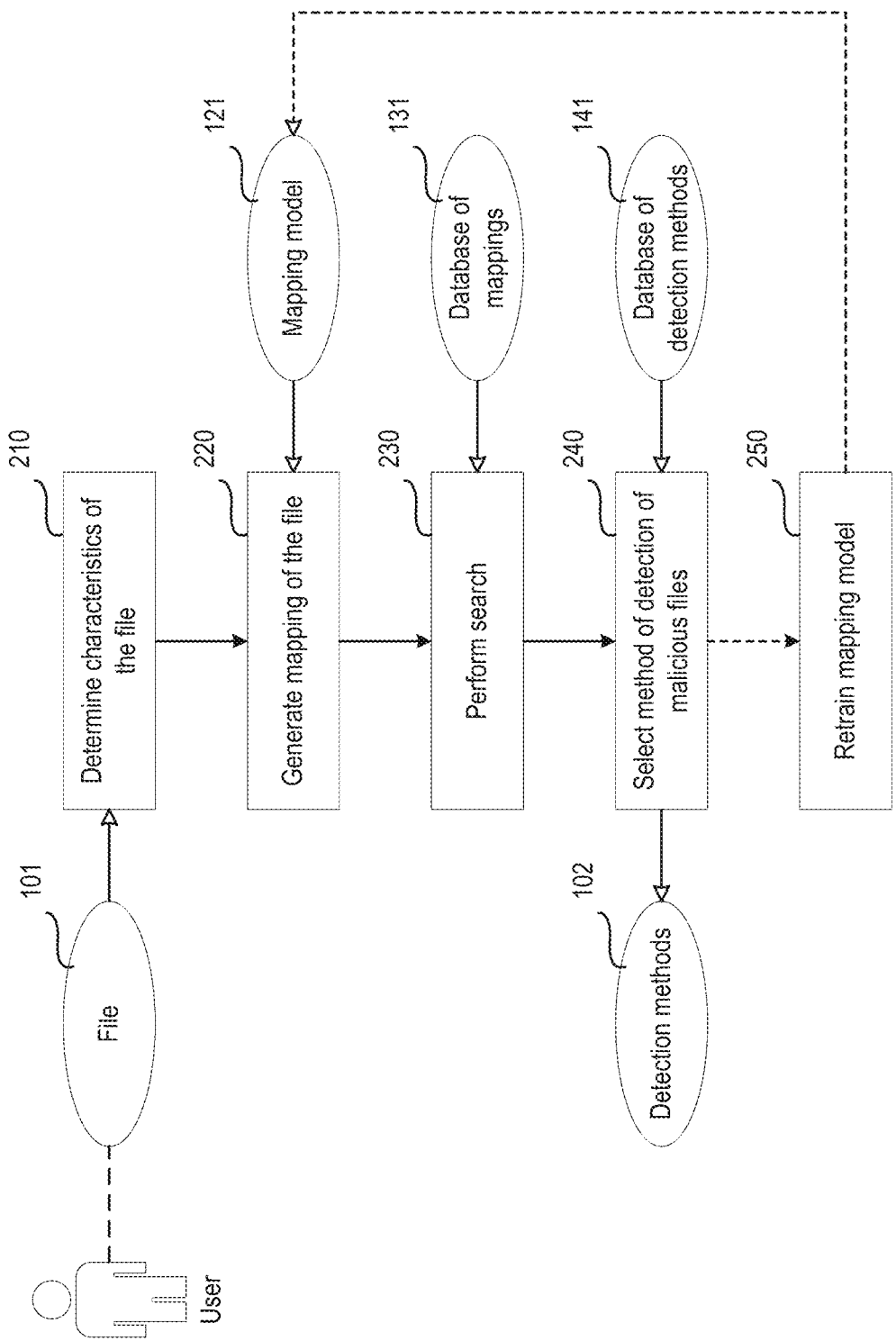
FIG. 2 illustrates a flow diagram of the method for detection of malicious files, in accordance with aspects of the present disclosure.

FIG. 2 illustrates a flow diagram of the method for detection of malicious files, in accordance with aspects of the present disclosure.

The flow diagram of the method for selecting method of detection of malicious files contains a step 210 in which the file characteristics determination module 110 determines the file characteristics based on predetermined rules. At step 220, the mapping module 120 generates mapping of the file 101 in probability space using the trained mapping model 121 on the basis of the characteristics of the file determined at step 210. At step 230, the search module 130 performs a search in the database of mappings 131 for a family of malicious files on the basis of the mapping of the file 101 generated at step 220.

At step 240, the selection module 140 selects from the database of detection methods of malicious files 141 a method of detection of malicious files 102. According to an aspect of the present disclosure, the selected method corresponds to the family of malicious files found in the database of mappings 131 in step 230. In addition, at step 240, the selection module 140 may utilize the selected method of detection of malicious files to change the category of the file being analyzed 101, if a certain category had been assigned to that file prior to this. Such category may include but is not limited to:

the category of malicious files;
the category of safe files;
the category of conditionally safe files;
the category of suspicious files;
the category of unknown files.

At step 250, the retraining module 150 retrains the mapping model 121 so that the degree of similarity of the generated mapping of the file 101 to a mapping of at least one file from a given family of malicious files is greater than that degree of similarity prior to the retraining of the mapping model 121.

Figure 3:
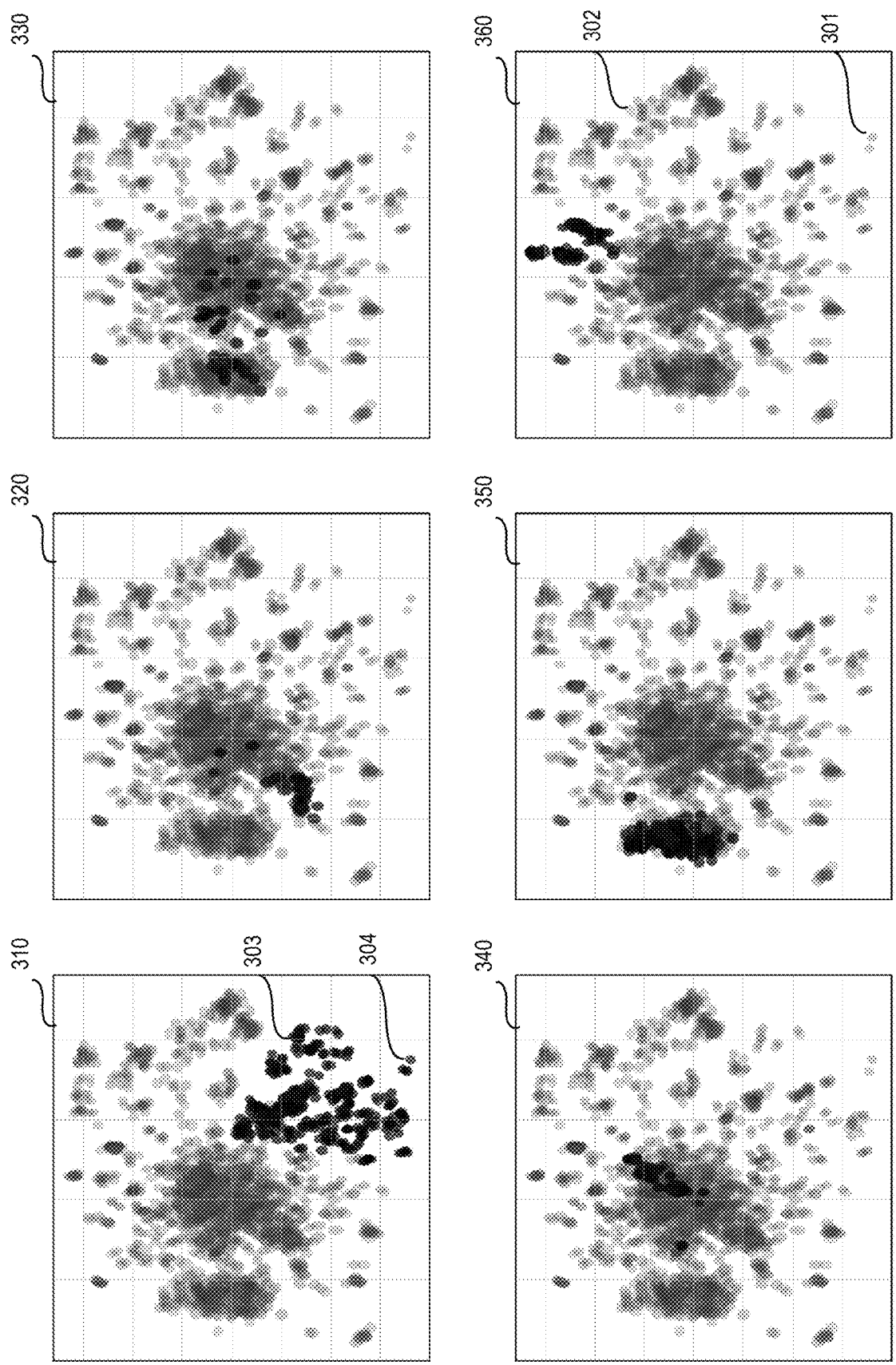
FIG. 3 shows a diagram illustrating an example of the mapping of families of malicious files in probability space, in accordance with aspects of the present disclosure.

FIG. 3 shows a diagram illustrating an example of the mapping of families of malicious files in probability space, in accordance with aspects of the present disclosure.

The diagram of the mapping of families of malicious programs in probability space contains a mapping of the files of the family AdWare.Win32.SmartInstaller 310, a mapping of files of the family Worm.Win32.Vobrus 320, a mapping of files of the family Backdoor.Win32.DarkKomet 330, a mapping of files of the family Trojan.Win32.ShipUp 340, a mapping of files of the family Trojan.Win32.AntiAV 350, a mapping of files of the family Trojan.Win32.Bayrod 360 FIG. 3 further shows a mapping of files of malicious collections 301 constructed on the basis of the characteristics of those files, a mapping of files of malicious collections 302 constructed on the basis of the behavior attributes of those files, a mapping of files of a given malicious family 303 constructed on the basis of the characteristics of those files, and a mapping of files of a given malicious family 304 constructed on the basis of the behavior attributes of those files.

In other words, FIG. 3 shows a diagram of the mapping of files from several malicious families. The files of the individual malicious families have both a similar functionality (behavior of the executable file) and similar structure. It should be noted that this similarity means that the mappings of the files of the same family are grouped in a compact region of probability space.

If the mapping of a certain file 101 also lies in a region occupied by mappings of files of any malicious family, then it may be affirmed with a high degree of probability that that file 101 may also belong to that malicious family.

If the mapping of a certain file 101 lies outside the regions occupied by mappings of files of malicious families, then it may be affirmed with a high degree of probability that that file 101 is a new variety not belonging to the known malicious families.

In the first case (when the mapping of a certain file 101 also lies in a region occupied by mappings of files of any malicious family), in order to verify that a certain file 101 is malicious, it may typically be enough to use one of the methods of detection of malicious files specializing in the detection with a high degree of probability of malicious files of the given malicious family. However, in the second case (when the mapping of a certain file 101 lies outside the regions occupied by mappings of files of malicious families), either a more careful manual analysis by a virus analyst or the use of several methods of detection of malicious files may be needed. As noted above, such analysis may require substantial waste of computing resources at least in some cases.

Figure 4:
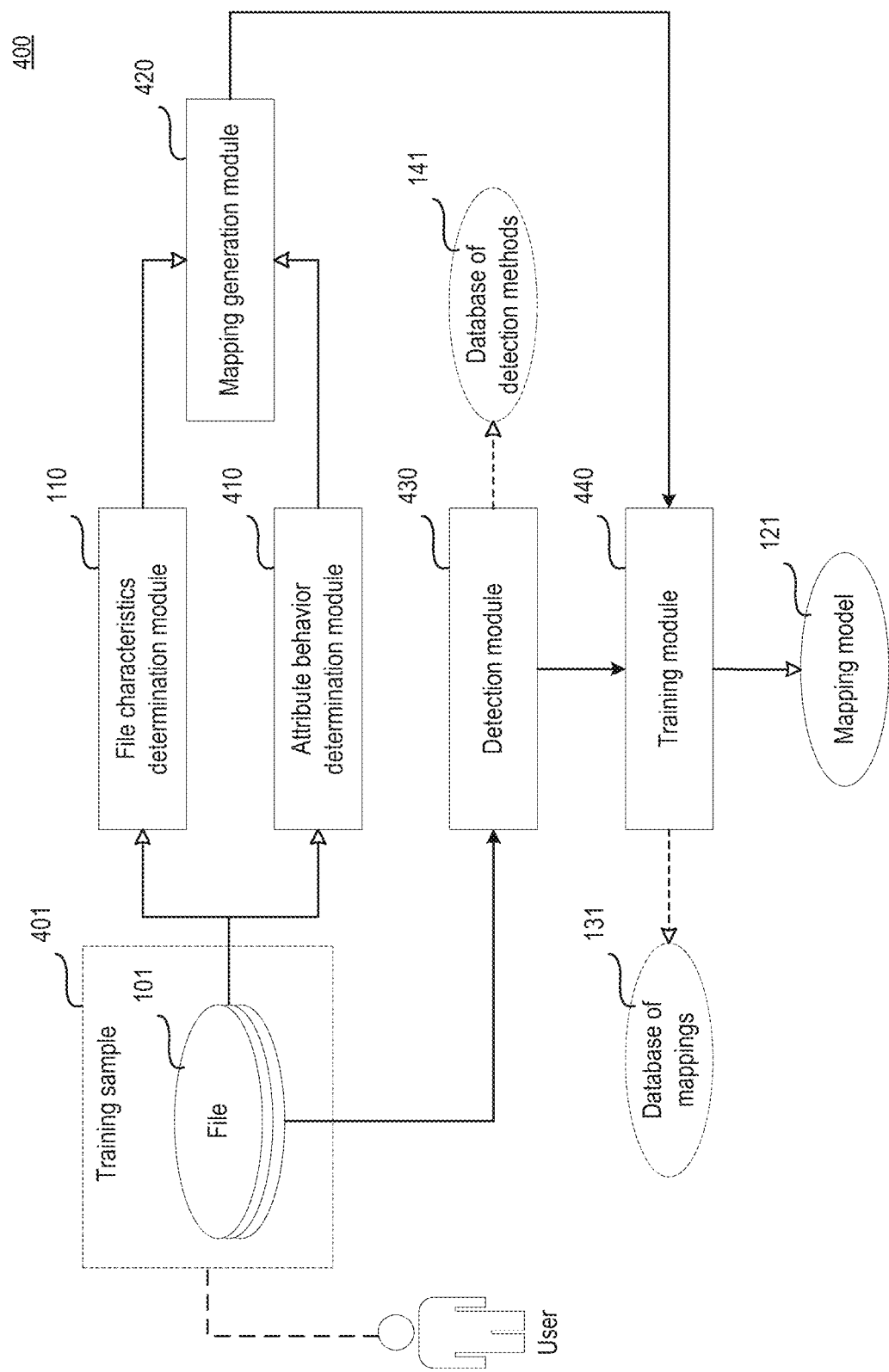
FIG. 4 illustrates the high-level architecture of the system for training a mapping model configured to map a file in probability space, in accordance with aspects of the present disclosure.

FIG. 4 illustrates the high-level architecture of the system for training a mapping model configured to map a file in probability space, in accordance with aspects of the present disclosure.

The system for training a model for mapping a file in probability space consists of a training sample 401, containing at least one file 101, a mapping model 121, a database of mappings 131, a database of detection methods 141, a file characteristics determination module 110, an attribute behavior determination module 410, a mapping generation module 420, a detection module 430, and a training module 440.

The attribute behavior determination module 410 is configured to determine the behavior attributes of the file 101 based on the action log. The log may be obtained based on an analysis of the execution of the file 101. The attribute behavior determination module 410 may be also configured to send the determined behavior attributes of the file 101 to the mapping generation module 420.

For example, the attribute behavior determination module 410 may be configured to determine the following behavior attributes of the file 101:

the number of running threads;
a flag indicating that a record was made in the registry;
the number of objects downloaded from a computer network (local area or global network);
a flag indicating that honeypots were accessed;
a flag indicating that the program has drawn a graphic interface (using the corresponding GUI functionality);
a flag indicating successful completion of the program;
the maximum consumption of RAM.

The mapping generation module 420 may be configured to generate a first mapping of the file 101 in probability space based on the determined characteristics of the file 101 and the second mapping of the file 101 in probability space based on the determined behavior attributes of the file 101.

The mapping generation module 420 may also be configured to send the formed file mappings to the training module 440.

In one aspect, probability space may be a multidimensional space in which each pair of characteristics of the file 101 and behavior attributes of the file 101 is matched up with a probability that the behavior described by the given behavior attributes is typical to the file 101 having those characteristics.

In yet another aspect, the mapping of the file 101 may be an aggregate of parameters describing a surface situated in that multidimensional space (for example, the coefficients in a polynomial of second order).

The detection module 430 may be configured to detect the file 101, determine to which malicious family the file 101 belongs to, and determine at least one method of detection of the malicious file which gave a positive result during the detection of the file 101. The detection module 430 may be further configured to send the determined information to the training module 440.

The training module 440 may be configured to train the mapping model 121 based on the generated first and second mappings of the file 101.

In one aspect, the training module 440 may be additionally configured to add the generated mappings of the file 101 which correspond to a particular malicious family to the database of mappings 131. In one aspect, the database of mappings 131 may include, but is not limited to:

the mapping of a file belonging to the given family of malicious files;
a summary mapping of all files belonging to the given family of malicious files.

In yet another aspect, the training module 440 may be additionally configured to add to the database of detection methods 141, the detection method determined during the detection of the file 101. The determined detection method corresponds to the determined malicious family.

An example of a simple training variant for the mapping model 121 may be:

$$ML_1(F_{file}, W_f) \rightarrow \{x_1, x_2\},$$

$$ML_2(F_{log}, W_l) \rightarrow \{x_1, x_2\},$$

where:
$ML_1$ is a trained mapping model 121, working with the characteristics of the training sample 401;
$ML_2$ is a trained mapping model 121, working with the behavior attributes 401;
$F_{file}$ are the characteristics of the file 401;
$F_{log}$ are the behavior attributes of the file 401;
$W_f$ are the tunable (trainable) parameters of the model $ML_1$;
$W_l$ are the tunable (trainable) parameters of the model $ML_2$.

For example:
if $W_f = W$, then $$\begin{aligned} ML_1(F_{file}, W_f) = \ & ML_1(\{a_1, a_2, \ldots, a_{99}\}, W) == [\{W[0] + W[1] \times \\ & a_1 + W[2] \times a_2 + \ldots + W[99] \times a_{99}, W[100] + \\ & W[101] \times a_1 + W[102] \times a_2 + \ldots + W[199] \times \\ = \ & [\{x_1, x_2\}] \end{aligned}$$

In one aspect a plurality of files (for example, N files, N=1000) may be sent to a file behavior emulator. After the file behavior emulator has been fine-tuned, the action logs may be formed:

$$\{(file_1, log_1), (file_2, log_2), \ldots\}$$

After the logs are generated, the distance between two objects (files or file behavior logs) may be determined:

$$\text{Distance}(\{x_1, y_1\}, \{x_2, y_2\}) = (x_1 - x_2)^2 + (y_1 - y_2)^2,$$

$$\text{Distance}(file_1, file_2) = \text{Distance}(ML_1(file_1, W_f), ML_1(file_2, W_f)),$$

$$\text{Distance}(file, log) = \text{Distance}(ML_1(file, W_f), ML_2(log, W_l)),$$

It should be noted that using the process of training the mapping model 121, such parameters $W_f$, $W_l$ may be chosen so that the averaged distance between the mappings of the file 401 and its corresponding action log (or otherwise between the characteristics of the file 401 and the behavior parameters of the file 401) will be less than a predetermined threshold value. Furthermore, $W_f$, $W_l$ may be chosen so that the averaged distance between the file 401 and a foreign action log of another file will be greater than a predetermined threshold value.

For example, the magnitude of the error may be numerically minimized as shown by the following formula:

$$\text{Loss}(W_f, W_l) == \left( \frac{1}{N} \times \sum_{i=1}^{N} \text{Distance}(ML_1(file_i, W_f), ML_2(log_i, W_l)) - \frac{1}{N(N-1)} \times \times \sum_{i \neq j}^{N} \text{Distance}(ML_1(file_i, W_f), ML_2(log_j, W_l)) \right) \rightarrow \min$$

Figure 5:
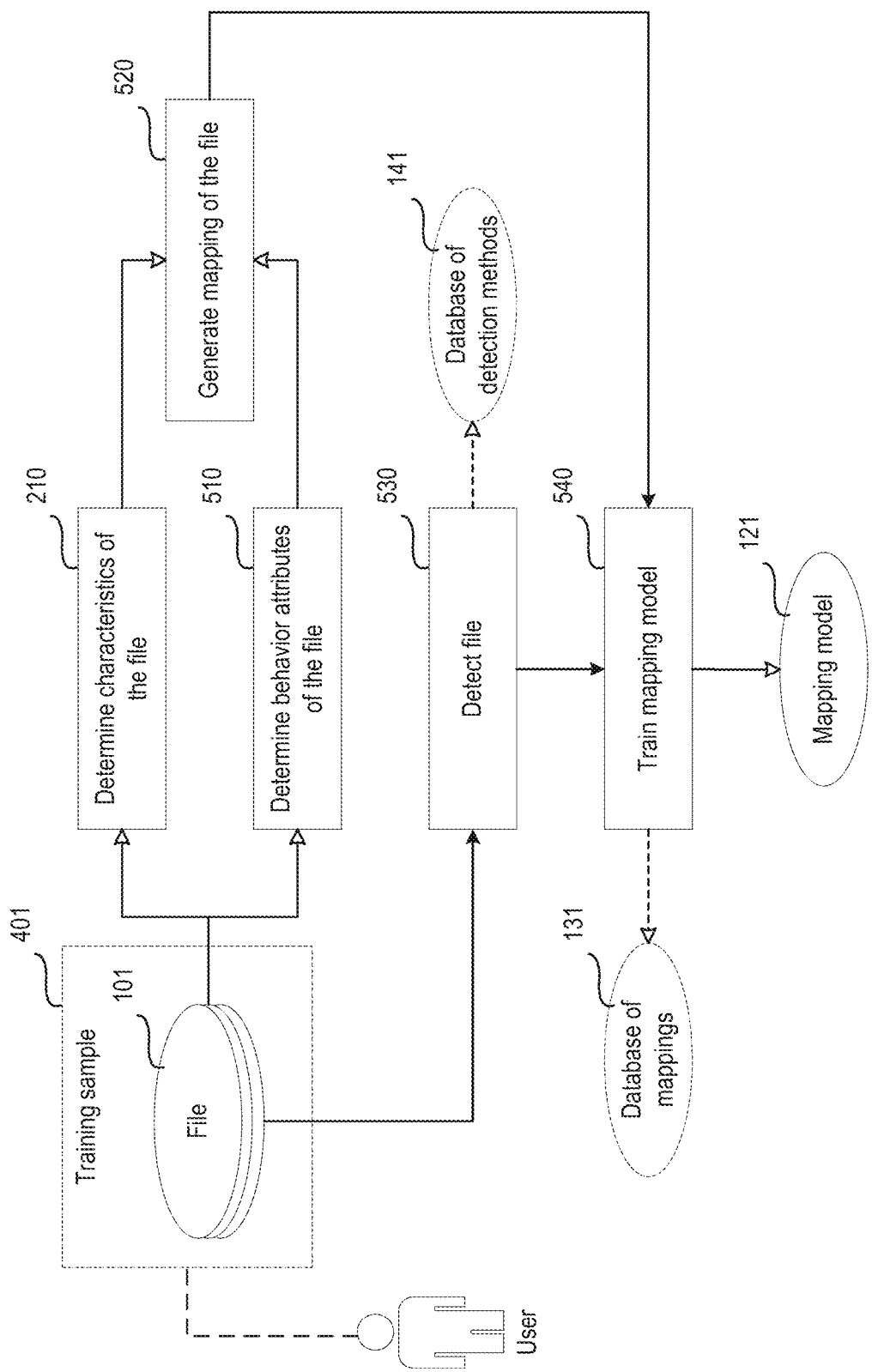
FIG. 5 illustrates a flow diagram of the method for training the mapping model, in accordance with aspects of the present disclosure.

FIG. 5 illustrates a flow diagram of the method for training the mapping model, in accordance with aspects of the present disclosure.

The flow diagram of the method for training the mapping model for mapping a file in probability space includes a step 210 in which the file characteristics determination module 110 determines the file characteristics based on predetermined rules. At step 510, the attribute behavior determination module 410 determines the file behavior attributes of the file 101 based on the action log obtained by analyzing the execution of the file 101. At step 520, the mapping generation module 420 generates a first mapping of the file in the probability space based on the characteristics of the file determined in step 210 and generates a second mapping of the file 101 in probability space based on the behavior attributes of the file 101 determined in step 410.

At step 530, the detection module 430 detects the file 101 by determining the malicious family to which the file 101 belongs. At this step, the detection module 430 may further determine at least one method of detection of the malicious file that gave a positive result during the detection of the file 101. At step 540, the training module 440 trains the mapping model based on the first and second mappings generated in step 520.

In addition, at step 540, if the detection module 430 detects the file 101 in step 530, the detection module 420 adds the mappings of the file 101 that correspond to a particular malicious family and that were generated in step 520 to the database of mappings 131. In one aspect, the database of mappings 131 may include, but is not limited to:

the mapping of a file belonging to the given family of malicious files;

a summary mapping of all files belonging to the given family of malicious files.

Figure 6:
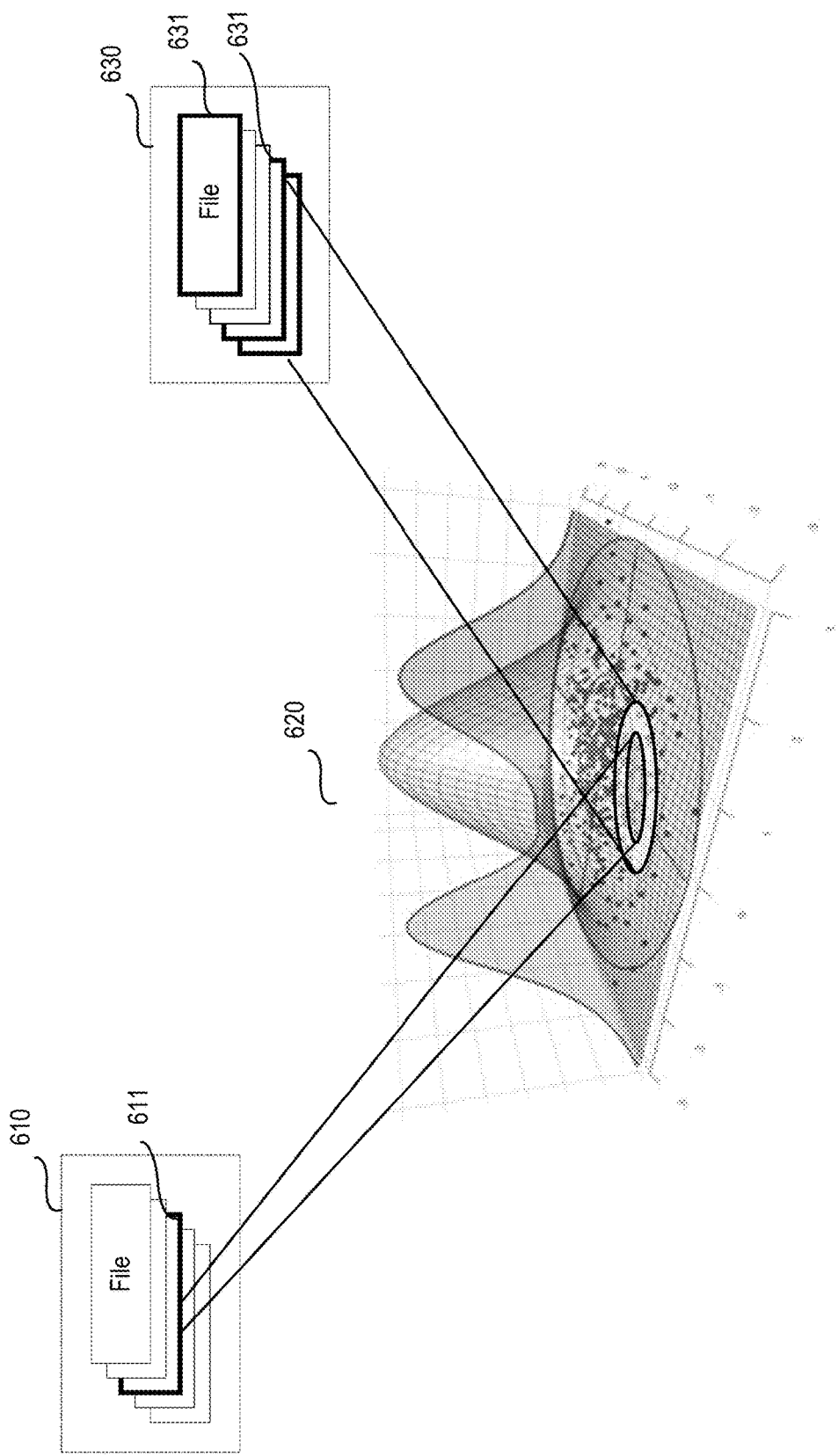
FIG. 6 shows a diagram illustrating an example of the selection of files based on a comparison of mappings, in accordance with aspects of the present disclosure.

The basic principle of the training is explained in greater detail in conjunction with FIG. 6.

FIG. 6 shows a diagram illustrating an example of the selection of files based on a comparison of mappings, in accordance with aspects of the present disclosure.

The diagram illustrating the example of the selection of files based on a comparison of mappings consists of a collection of files to be analyzed 610, which contains the file being analyzed 611, mappings of files 620, and a collection of malicious files 630 which contains malicious files 631 similar to the file being analyzed 611.

For the analysis of files for malware, a certain sample of files 610 is formed, from which one file 611 at a time is chosen in sequence during this analysis.

For each file, its characteristics are determined (step 210) and a mapping of the file is generated in probability space (step 220) Next, the generated mapping is compared 620 with the mappings calculated for the predetermined collection of malicious files 630.

In this process, each analyzed file 611 may be matched up with several files 631 from the sample of malicious files 630 that have mapping similar to the mapping of the analyzed file 611.

In certain aspects, the algorithms for the generation of the mapping of the file may be chosen so that files having a similar structure or similar behavior during their execution have similar mappings (i.e., mappings situated in the same region of probability space).

Advantageously, the disclosed approach determines not only whether the file 611 is malicious (i.e., similar to other malicious files 631), but also determines whether or not the file 611 belongs to any malicious family.

In yet another aspect, the above-described systems and methods (FIG. 1-FIG. 6) may be used for the classification and clustering of malicious collections. This classification may divide the whole collection of malicious files into several different malicious families characterized by a similar composition or behavior of files.

Figure 7:
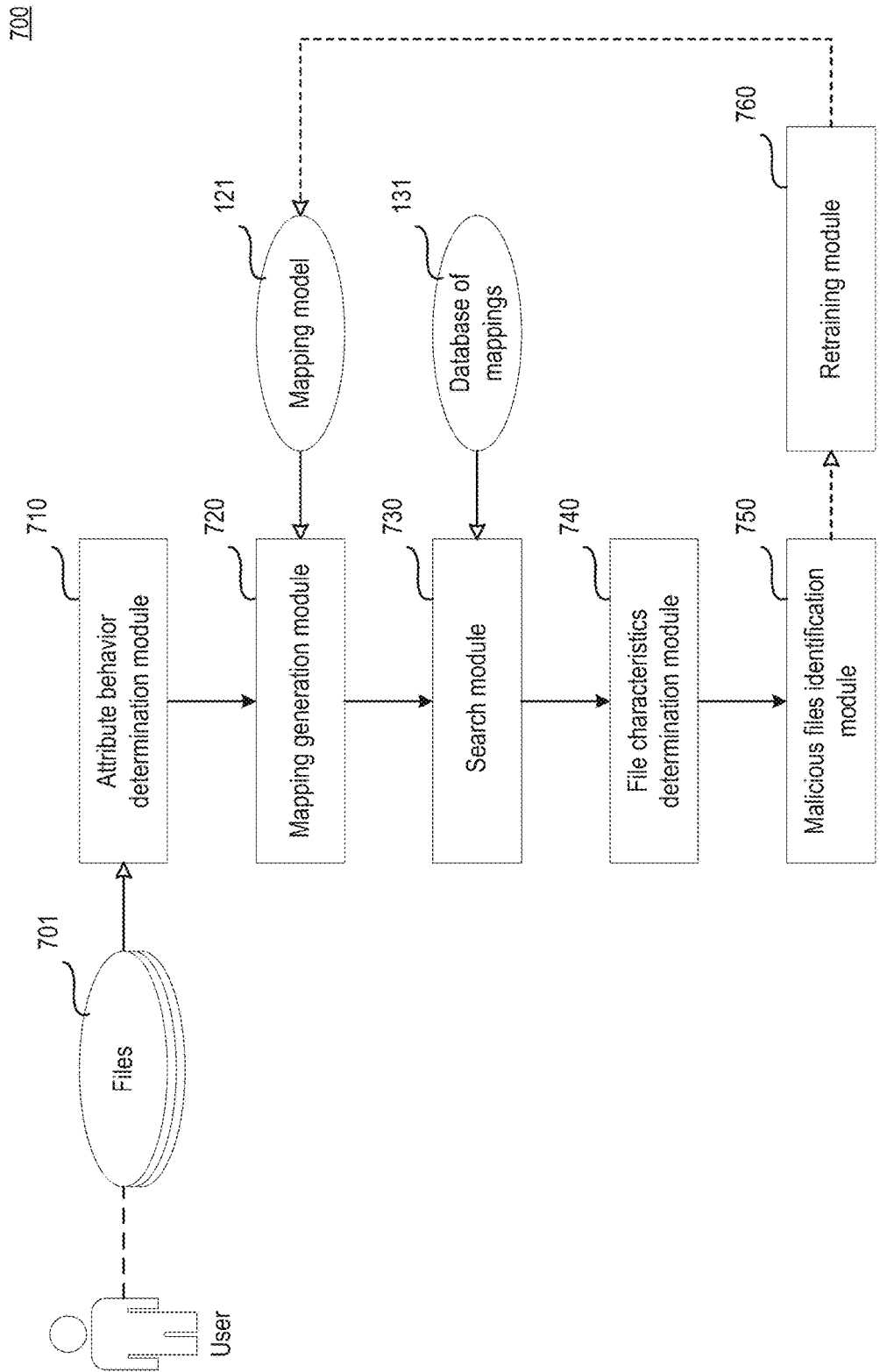
FIG. 7 illustrates the high-level architecture of the system for detection of sources of malicious activity, in accordance with aspects of the present disclosure.

FIG. 7 illustrates the high-level architecture of the system for detection of sources of malicious activity, in accordance with aspects of the present disclosure.

The system for detection of sources of malicious activity consists of the executable files of the operating system 701, a mapping model 121, a database of mappings 131, an attribute behavior determination module 710, a mapping generation module 720, a search module 730, a file characteristics determination module 740, a malicious files identification module 750, and a retraining module 760.

The attribute behavior determination module 710 is configured to determine the behavior attributes of the files 701 (both collections of files, and individual files) running in the operating system based on the action log. These action logs may be obtained based on an analysis of the working of the operating system. The attribute behavior determination module 710 may also be configured to send the determined behavior attributes of the files 701 to the mapping generation module 720.

The mapping generation module 720 is configured to generate a mapping of the files 701 in probability space using the trained mapping model 121 based on the determined behavior attributes of the files 701. The mapping generation module may also be configured to send the generated mapping of the files 701 to the search module 730.

In one variant aspect, probability space may be a multi-dimensional space in which each pair of characteristics of the file and behavior attributes of the file is matched up with a probability that the behavior described by the given behavior attributes is typical to the file having those characteristics.

In yet another variant aspect, the mapping of the file may be an aggregate of parameters describing a surface situated in that multidimensional space.

The search module 730 is configured to perform a search in the database of mappings 131 for a family of malicious files based on the generated mapping of the files. The search module 730 may also be configured to send the results of the search to the file characteristics determination module 740.

In one aspect, a search is made in the database of mappings 131 for a family of malicious files. In one aspect, the database of mappings 131 may include, but is not limited to:

a file whose mapping has a degree of similarity to the generated mapping which is greater than a predetermined established threshold value;

the summary mapping of all files having a degree of similarity to the generated mapping which is greater than a predetermined threshold value.

The file characteristics determination module 740 is configured to identify the characteristics of files corresponding to the family of malicious files found in the database of mappings 131. The file characteristics determination module 740 may also be configured to send the identified characteristics of files to the malicious files identification module 750.

The malicious files identification module 750 is configured to perform a search for the malicious file which is the source of malicious activity in the operating system. The identified typically corresponds to the identified characteristics of the files.

The retraining module 760 is configured to retrain the mapping model 121 so that the degree of similarity of the formed mapping of files to the mapping of at least one file from a given family of malicious files is greater than the degree of similarity prior to the retraining of the mapping model 121.

In one aspect, the source of a malicious threat might be not the malicious file as such, but rather a network resource which at least:

was the source of an attack on the computing device (for example, a DDoS attack, the deployment of exploits, and so forth);

is the source of propagation of malicious files on the computing device (for example, when using malware downloaders, and the like).

In other words, the malicious files identification module 750 may be configured to determine that malicious activity has taken place on the computing device based on an analysis of the determined behavior attributes of files 701 of the operating system. The malicious files identification module 750 may also be capable of determining the source of the determined malicious activity, which may include a certain network resource (a site from which a malicious file was downloaded, IP addresses from which a DDoS attack was conducted, and the like).

Accordingly, the disclosed system is configured to fight and counteract various targeted attacks (APTs—advanced persistent threats).

Figure 8:
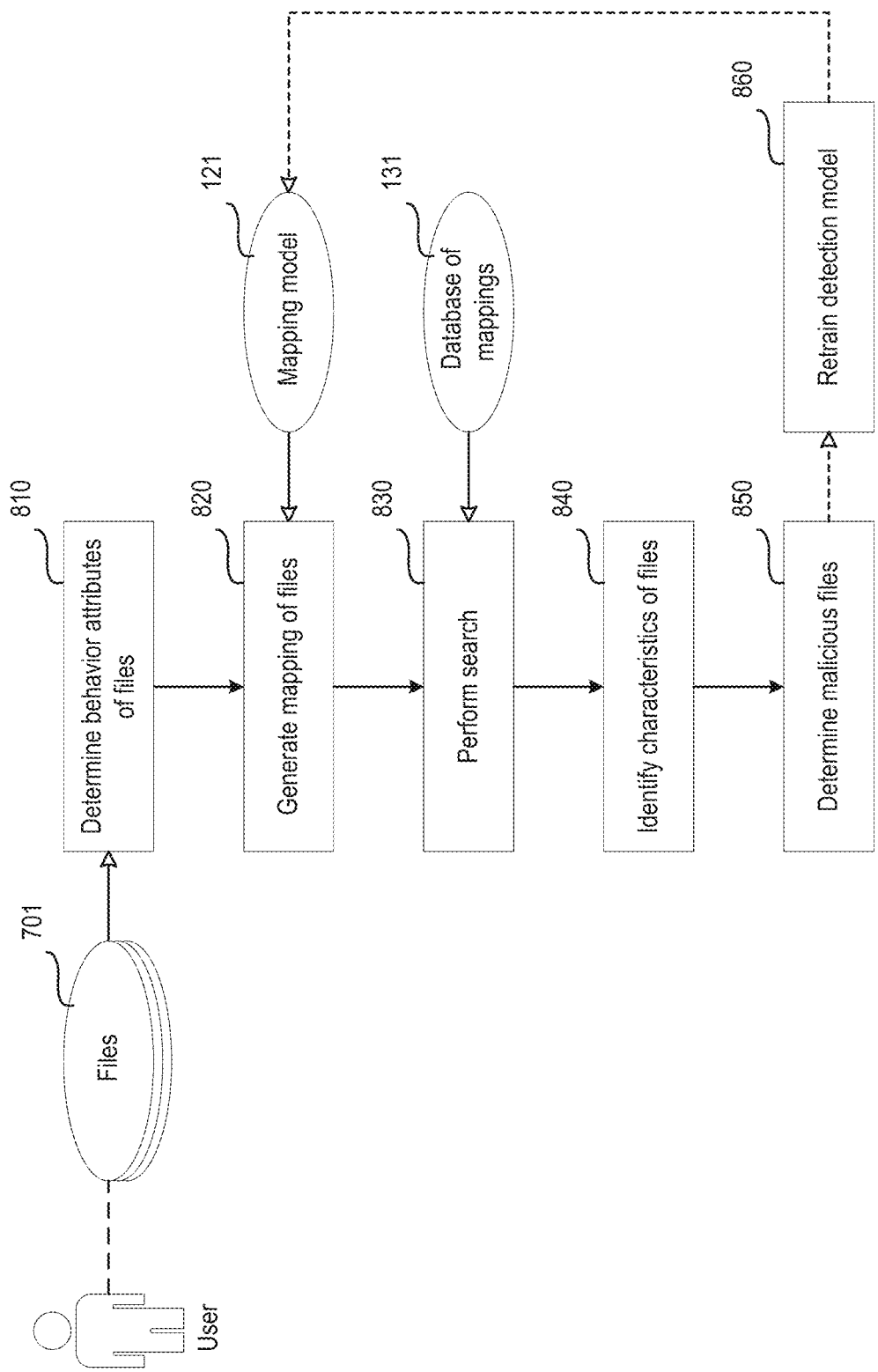
FIG. 8 illustrates a flow diagram of the method of detection of sources of malicious activity, in accordance with aspects of the present disclosure.

FIG. 8 illustrates a flow diagram of the method of detection of sources of malicious activity, in accordance with aspects of the present disclosure.

The flow diagram of the method of detection of sources of malicious activity contains a step 810 in which the attribute behavior determination module 710 determines the behavior attributes of files running in the operating system based on the action log. In one aspect, such action logs may be obtained based on an analysis of the working of the operating system. At step 820, the mapping generation module 720 generates mappings of the files 701 in probability space using the trained mapping model 121 based on the behavior attributes of the files 701 determined in step 810. At step 830, the search module 730 performs a search in the database of mappings 131 for a family of malicious files on the basis of the mapping of the files 701 generated in step 820.

At step 840, the file characteristics determination module 740 identifies the characteristics of the files corresponding to the family of malicious files found in step 830 in the database of mappings 131. At step 850, the malicious files identification module 750 determines the malicious file which may be the source of the malicious activity in the operating system. The identified malicious file may have corresponding characteristics of the files identified in step 840. At step 860, the retraining module 760 retrains the mapping model 121 so that the degree of similarity of the generated mapping of the files 701 to a mapping of at least one file from a given family of malicious files is greater than the degree of similarity prior to the retraining of the mapping model 121.

Figure 9:
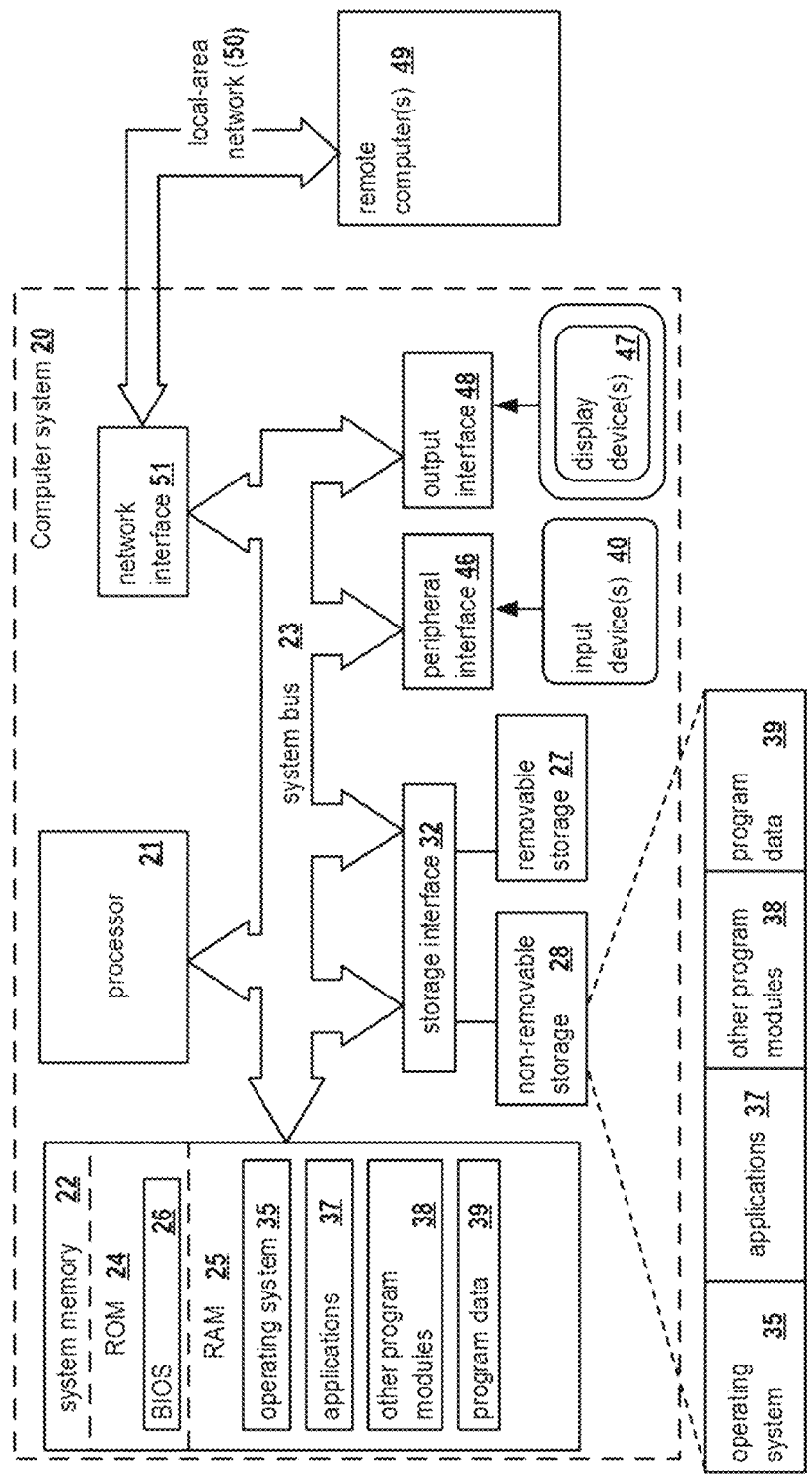
FIG. 9 presents an example of a general-purpose computer system on which aspects of the present disclosure can be implemented, in accordance with aspects of the present disclosure.

FIG. 9 is a block diagram illustrating a computer system 20 on which aspects of systems and methods for detection of malicious files may be implemented in accordance with an exemplary aspect. The computer system 20 may represent computer systems 100, 400 and 700 from FIGS. 1, 4 and 7 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detection of malicious files, the method comprising:
    training a mapping model for mapping files in a probability space characterizing one or more families of malicious files;
    determining a plurality of characteristics of an analyzed file based on a set of rules;
    generating, using the mapping model, a mapping of the analyzed file in the probability space based on the determined plurality of characteristics;
    searching a first database using the generated mapping of the analyzed file, wherein the first database stores mappings associated with one or more families of malicious files;
    determining whether the analyzed file is associated with a family of malicious files,; and
    in response to determining that the analyzed file is associated with the family of malicious files, selecting one or more methods of malware detection from a second database, wherein the second database stores a plurality of malware detection methods; and
    detecting the associated family of malicious files using the selected one or more methods.

2. The method of claim 1, wherein the probability space comprises a multidimensional space, and wherein the probability space provides a probability distribution for the plurality of characteristics associated with the analyzed file.

3. The method of claim 2, wherein the generated mapping comprises an aggregate of a plurality of parameters describing a surface associated with the analyzed file and wherein the surface is situated in the probability space.

4. The method of claim 2, wherein the probability space comprises a multidimensional space in which a pair of one of the plurality of characteristics of the file and one of a plurality of attributes associated with the behavior of the file are matched up with a probability that the behavior described by the one the plurality of attributes is typical to the file having the one of the plurality of characteristics.

5. The method of claim 1, wherein the first database comprises a mapping of a file associated with a particular family of malicious files or a summary mapping of a plurality of files associated with a particular family of malicious files.

6. The method of claim 5, wherein the searching the first database further comprises identifying an association between the analyzed file and one of the files associated with the family of malicious files, wherein a degree of similarity between the mapping of the analyzed file and mapping of the file associated with the family of malicious files exceeds a predetermined threshold.

7. The method of claim 1, further comprising retraining the mapping model to increase the degree of similarity between the mapping of the analyzed file and mapping of one of the files associated with the family of malicious files within the trained mapping model as compared to a corresponding degree of similarity between respective files within the mapping model prior to performing the retraining.

8. A system for detection of malicious files, the system comprising:
   a hardware processor and a memory storing instructions for execution by the hardware processor, wherein the hardware processor and the memory are configured to:
   train a mapping model for mapping files in a probability space characterizing one or more families of malicious files;
   determine a plurality of characteristics of an analyzed file based on a set of rules;
   generate a mapping of the analyzed file in the probability space based on the determined plurality of characteristics;
   search a first database using the generated mapping of the analyzed file, wherein the first database stores mappings associated with one or more families of malicious files;
   determine whether the analyzed file is associated with a family of malicious files,; and
   in response to determining that the analyzed file is associated with the family of malicious files, select one or more methods of malware detection from a second database, wherein the second database stores a plurality of detection methods; and
   detect the associated family of malicious files using the selected one or more methods.

9. The system of claim 8, wherein the probability space comprises a multidimensional space, and wherein the probability space provides a probability distribution for the plurality of characteristics associated with the analyzed file.

10. The system of claim 9, wherein the generated mapping comprises an aggregate of a plurality of parameters describing a surface associated with the analyzed file and wherein the surface is situated in the probability space.

11. The system of claim 9, wherein the probability space comprises a multidimensional space in which a pair of one of the plurality of characteristics of the file and one of a plurality of attributes associated with the behavior of the file are matched up with a probability that the behavior described by the one the of plurality of attributes is typical to the file having the one of the plurality of characteristics.

12. The system of claim 8, wherein the first database comprises a mapping of a file associated with a particular family of malicious files or a summary mapping of a plurality of files associated with a particular family of malicious files.

13. The system of claim 12, wherein the hardware processor configured to search the first database is further configured to identify an association between the analyzed file and one of the files associated with the family of malicious files, wherein a degree of similarity between the mapping of the analyzed file and mapping of the file associated with the family of malicious files exceeds a predetermined threshold.

14. The system of claim 8, wherein the hardware processor is further configured to retrain the mapping model to increase the degree of similarity between the mapping of the analyzed file and mapping of one of the files associated with the family of malicious files within the mapping model as compared to a corresponding degree of similarity between respective files within the mapping model prior to performing the retraining.

15. A non-transitory computer readable medium storing thereon computer executable instructions for detection of malicious files, including instructions for:
   training a mapping model for mapping files in a probability space characterizing one or more families of malicious files;
   determining a plurality of characteristics of an analyzed file based on a set of rules;
   generating a mapping of the analyzed file in the probability space based on the determined plurality of characteristics;
   searching a first database using the generated mapping of the analyzed file, wherein the first database stores mappings associated with one or more families of malicious files;
   determining whether the analyzed file is associated with a family of malicious files,; and
   in response to determining that the analyzed file is associated with the family of malicious files, selecting one or more methods of malware detection from a second database, wherein the second database stores a plurality of malware detection methods; and
   detecting the associated family of malicious files using the selected one or more methods.

16. The non-transitory computer readable medium of claim 15, wherein the probability space comprises a multidimensional space, and wherein the probability space provides a probability distribution for the plurality of characteristics associated with the analyzed file.

17. The non-transitory computer readable medium of claim 16, wherein the generated mapping comprises an aggregate of a plurality of parameters describing a surface associated with the analyzed file and wherein the surface is situated in the probability space.

18. The non-transitory computer readable medium of claim 16, wherein the probability space comprises a multidimensional space in which a pair of one of the plurality of characteristics of the file and one of a plurality of attributes associated with the behavior of the file are matched up with a probability that the behavior described by the one of the plurality of attributes is typical to the file having the one of the plurality of characteristics.

19. The non-transitory computer readable medium of claim 15, wherein the searching the first database further comprises identifying an association between the analyzed file and one of the files associated with the family of malicious files, wherein a degree of similarity between the mapping of the analyzed file and mapping of the file associated with the family of malicious files exceeds a predetermined threshold.

20. The non-transitory computer readable medium of claim 15, further comprising instructions for retraining the mapping model to increase the degree of similarity between the mapping of the analyzed file and mapping of one of the files associated with the family of malicious files within the trained mapping model as compared to a corresponding degree of similarity between respective files within the mapping model prior to performing the retraining.

\* \* \* \* \*